United States Patent Office 2,827,426
Patented Mar. 18, 1958

2,827,426

CATIONIC PERMSELECTIVE MEMBRANES AND THEIR USE IN ELECTROLYSIS

George W. Bodamer, Cheltenham, Pa., assignor to Rohm & Haas Company, Philadelphia, Pa., a corporation of Delaware No Drawing. Application February 12, 1954
Serial No. 410,051

17 Claims. (Cl. 204—98)

This invention relates to permselective membranes containing cation-exchange resins, to the preparation of such membranes and to the use of the membranes in electrolytic processes.

An object of this invention is to provide films or membranes of bonded particles of cation-exchange resins, which films are permselective and are particularly adapted for use in the electrolytic conversion of alkali metal halides to caustic alkali and free halogens. An object is to provide ion-exchange films which are permselective as to particles carrying a positive electric charge and which, therefore, permit the passage of cations through the films, while at the same time preventing the passage of undesirable amounts of anions. A further object is to provide films which are physically strong, self-supporting, and which can be conveniently handled and can be attached to structural members, and which remain intact when they are alternately wet and dried and which also are unusually resistant to the chemical action of acids, bases and salts, as well as of strong oxidizing solutions.

The membranes of this invention are made by uniformly and intimately dispersing a cation-exchange resin of the sulfonic or the carboxylic type in a film or matrix which comprises a polymer of a perhaloethylene—particularly a polymer of trifluorochloroethylene or tetrafluoroethylene.

The polymers of perhaloethylene which are employed are well-known. They are available commercially and are described, for example, in U. S. Patents 2,393,967 and 2,600,202. They are polymers of trifluorochloroethylene or tetrafluoroethylene and are currently marketed under the trademarks "Kel-F," "Halocarbon" and "Teflon." The molecular weights of the polymers may vary so widely that some of the polymers are oils while others are solids. Since the products of this invention are necessarily solid, it is essential that the matrix which binds the particles of cation-exchange resins be solid. In preparing the membranes by milling, however, it is recommended that some liquid polymer be present in order to facilitate the dispersion of the ion-exchange resin in the solid polymer, even though some or all of the more volatile oil may leave the film during or after fabrication.

It is much easier to disperse the ion-exchange resins in polymers of trifluorochloroethylene than in polymers of tetrafluoroethylene, and accordingly, it is much preferred to employ the former. The cost of the membranes is much reduced and the ease of fabricating them is greatly increased when other thermoplastic resins are blended with the fluoro compounds. Polyethylene, polyvinyl chloride and copolymers of vinyl chloride and vinylidene chloride have been employed successfully for this purpose. Such membranes are less resistant to the destructive effects of the anolytes encountered in the electrolysis of alkali metal halides than are the membranes which contain only the fluoro polymers. But they are far more resistant than those made with polyethylene or vinyl resins alone and their resistance increases with the amount of fluoro polymer. Membranes can be made of which the matrices contain blends in all proportions of polyethylene or vinyl resins with the fluoro polymers. The presence of as little as 10% of a solid fluoro polymer in a matrix which otherwise contains polyethylene or a vinyl resin is evident in the increased chemical resistance of the resultant membrane. For practical purposes, however, at least 25% of the matrix should be fluoro polymer; and it is actually preferred that a predominant amount of fluoro polymer be present in the matrices of the permselective membranes. Mixtures of polymers of trifluorochloroethylene and polymers of tetrafluoroethylene can likewise be used as well as copolymers of trifluorochloroethylene and tetrafluoroethylene, such as are described, for example, in U. S. Patent 2,662,072.

The cation-exchange resins which are preferred for incorporation in the films of this invention are those of the sulfonic and carboxylic types, many of which are available commercially. These resins include the sulfonated phenolaldehyde products, such as are described in U. S. Patents Nos. 2,184,943; 2,195,196; 2,204,539; 2,228,159; 2,228,160; 2,230,641; 2,259,455; 2,285,750; 2,319,359; and 2,361,754. Also included are the sulfonated cross-linked polymers of styrene as shown in U. S. Patent 2,366,007. The carboxylic resins are typified by and include those described in U. S. Patents Nos. 2,340,110 and 2,340,111. All of these resins are characterized by being insoluble and infusible and capable of sorbing cations from fluids. The resins can be in the form of irregularly shaped particles, as a result of grinding, or in the form of spheroids. While the size of the particles can vary within reasonable limits, it is definitely preferred that they be small. All of the particles should be small enough to pass through a U. S. Standard sieve No. 50 and preferably through a U. S. Standard sieve No. 100. The amount of resin in the membrane is an important factor, since the physical properties, such as density and porosity, as well as the electrochemical properties, such as permeselectivity and rate of migration of cations through the film, are dependent on the proportions of resin and binder in the film. The porosity, leakage and brittleness of the film increase with an increase in the amount of resin, as does the rate of migration of cations through the film. Another consideration is the fact that particles of resins swell in contact with the aqueous solutions and the ratio of resin to binder must be such that the film is not ruptured as the resin swells. What is essential is that the membrane contain the maximum amount of resin which can be bound by the matrix in a film which is somewhat flexible, tough, and is capable of being alternately wet and dried without breaking. Ordinarily the resin constitutes from about 40% to about 80% of the total weight of the dry film.

The resin which is incorporated in the film can be in the hydrogen form or in the salt form. It should be noted that the films expand when the resin particles therein change from the hydrogen or the acid form to the salt form. This provides a convenient way of preparing tight films having a minimum of openings or spaces between the particles and the binder, since the films can be made from a resin in the hydrogen form and the resin can then be converted to the more bulky salt form by immersion of the films in salt solutions.

The most convenient methods for making the membranes of this invention are currently those which are customarily used in preparing sheets of rubber or plastics. Thus, for example, the resin and binder are mixed and mechanically worked on a hot roller mill, and the film is then stripped from the roller. Alternatively the binder may first be banded on a roller mill and the particles of resin then added to the binder and thoroughly incorporated therein. Membranes can be made by extruding an intimate mixture of resin and binder or by compression molding. Also a film can be sliced from a block of a mixture of resin and binder. Other sheet-forming methods can be employed and this invention, which resides in new, durable, permselective, cationic films and the method of using them, is not to be limited by the particular mechanical technique or operation by which the film is formed. It has been found advisable to press the sheet of resin and binder between hot platens as a means of removing irregularities in the films. What is essential is that the cation-exchange resin be evenly dispersed throughout the film and that the particles of resin extend contiguously throughout the entire thickness of film. Although it is not deemed necessary, a supporting member such as a web of Saran screening, glass fibers, or cloth may be employed to reinforce the membrance if desired.

Herein the word "film" is used in the accepted sense as being synonymous with "sheet" or "pellicle" or "membrane" or "diaphragm" and as describing a layer of material. Films which have thicknesses of about 10 to 100 mils are eminently satisfactory for most industrial applications and are preferred.

The particular permselective membranes which are described herein are eminently suitable for use in those electrolytic processes where the anolyte is particularly corrosive by virtue of containing oxidizing products of the electrolytic processes.

It has been proposed heretofore to employ porous diaphragms between the anode and the cathode in an electrolytic cell in which an alkali metal halide is electrolyzed and is thereby converted into a metal hydroxide and elemental halogen such as the electrolytic conversion of sodium chloride brine into sodium hydroxide and chlorine. Such porous diaphragms, however, do not prevent the diffusion of ions from one electrode compartment to the other. It has also been proposed to substitute for such porous diaphragms essentially continuous and non-porous, permselective membranes which have an advantage over the porous diaphragms in that they effectively prevent diffusion of ions, particularly the diffusion of hydroxyl ions from the cathode compartment in which they are formed into the anode compartment. Membranes which have been suggested for this purpose are described for example in another of my applications, Serial No. 202,577, now U. S. Patent No. 2,681,320. Those membranes contain cation-exchange resins embedded in certain matrices, and while they may be suitable for certain electrolytic processes, their use in the electrolysis of alkali metal halides has not become widely adopted because the membranes which are of necessity in contact with an oxidizing anolyte soon become eroded and then develop small holes, which eliminates their effectiveness. The membranes described herein are much more resistant to erosion by an oxidizing anolyte than are any permselective membranes described heretofore. Consequently, by the use of these membrances, the process of electrolyzing a solution of an alkali metal halide is much improved and is far more economical and efficient. The following examples illustrate the preparation of the permselective membranes of this invention and the use of the membranes in the electrolytic conversion of alkali metal halides to hydroxides of the metals and elemental halogens. It is to be understood, however, that this invention is not limited to the electrolysis of sodium chloride alone, but applies equally well to the conversion of the chlorides, bromides and iodides of the other alkali metals, such as potassium and lithium.

*Example 1*

A polymer of trifluorochloroethylene (Halocarbon) was banded on a rubber mill, heated to 320° F. Then there was added over a period of about 5 minutes an equal weight of particles of a commercially available cation-exchange resin. The cation-exchange resin was known to be a sulfonated copolymer of styrene and divinylbenzene, made by the process of U. S. Patent No. 2,366,007, and the particles were of such a size as to all pass through a U. S. Standard sieve No. 100. The combination of resin and matrix was milled for 10 minutes after which it was removed from the roller. The resultant sheet which appeared to be uniform was then pressed for 10 minutes at 325° F. under a pressure of 1600 lbs./sq. in. The resultant membrane was smooth and flat and had a thickness of 55 mils.

*Example 2*

The permselective membrane prepared by the process of Example 1 above was then placed in an electrolytic cell between a platinum anode and a stainless steel cathode, thus dividing the cell into two compartments. Into the anode compartment was introduced a 20% solution of sodium chloride at such a rate as to maintain a supply of chloride ions well in excess of the amount which was decomposed by the electric current. Water was fed into the cathode compartment at such a rate as to maintain a concentration therein from 20%–30% sodium hydroxide. That is to say, a brine solution was passed through the anode compartment continuously while water was passed into the cathode compartment, and an aqueous solution of sodium hydroxide was removed continuously from the cathode compartment. The current density across the permselective membrane was held at 75–90 amperes/sq. ft. and the temperature within the cell varied from about 50° to 60° C. Under these conditions approximately 3 gram-equivalent weights of chlorine were liberated each hour per square foot of membrane. The process was run continuously and uniformly for 110 days, indicating no substantial change in the condition of the membrane.

In contrast with the above performance, a membrane made by intimately dispersing the same cation-exchange resin in polyethylene and having a cation-exchange resin content of 75% survived only 14 days in the same process. At the end of that time the polyethylene membrane was found to be badly eroded, to have become much thinner, and to have developed several small pin-holes.

The erosion took the form of fine granulation of the surface of the membrane on the side facing the anode, followed by a wearing away of the film. The membrane gradually became thinner and ultimately developed pin-holes. The erosion occurred over the entire area exposed to the anolyte but was more severe toward the top.

*Example 3*

The process of Example 2 was followed using the same permselective membrane. In this case, however, the current density was 150 amperes/sq. ft., as a result of which the temperature within the cell varied from about 70° to about 95°. Thus, in this instance, the membrane was exposed to higher temperatures and a greater concentration of chlorine. At the end of 25 days of continuous operation, the membrane was fully intact.

In contrast with the above performance, a membrane made by intimately dispersing the same cation-exchange resin in polyethylene failed in one day under the same conditions.

*Example 4*

A permselective membrane was made by dispersing the same cation-exchange resin employed in Example 1 in a mixture of 30% polytetrafluoroethylene and 70% polyethylene. The process of Example 1 was followed and the resultant membrane contained 76% of the cation-exchange resin and 24% of the mixed binder. It was smooth, flat, uniform in appearance, and had a thickness of about 50 mils.

The permselective membrane was placed in an electrolytic cell which was operated continuously under the same conditions as are described in Example 2. The membrane was considered to have failed after 41 days of operation.

The electrolytic cell described above contains two compartments separated by the cationic permselective membrane, and it is in such an apparatus that the advantage of the membranes described herein is most evident. It must be pointed out, however, that the membranes of the instant invention have the same advantage when employed in multi-compartment electrolytic cells which are used for the deionization of water and in which a plurality of alternating cationic and anionic permselective membranes are used to divide the cell into a plurality of compartments with a cationic permselective membrane adjacent to the anode. In such an apparatus the membrane in contact with the anolyte is subject to the same eroding effect of the anolyte as occurs in the simpler two-compartment cell.

I claim:

1. In the electrolytic conversion of an alkali metal halide to an alkali metal hydroxide and elemental halogen wherein a direct current is passed through an electrolysis cell containing a solution of said alkali metal halide, the improvement which consists of interposing between the anode and the cathode of said cell and adjacent to said anode an essentially continuous and non-porous, permselective membrane comprising particles of cation-exchange resin dispersed intimately and uniformly throughout a matrix consisting essentially of a polymer of at least one perhaloethylene from the group consisting of trifluorochloroethylene and tetrafluoroethylene, thereby forming an anode compartment which is separated from the remainder of the cell by means of said membrane.

2. In the electrolytic conversion of an alkali metal halide to an alkali metal hydroxide and elemental halogen wherein a direct current is passed through an electrolysis cell containing a solution of said alkali metal halide, the improvement which consists of interposing between the anode and the cathode of said cell an essentially continuous and non-porous, permselective membrane comprising particles of cation-exchange resin dispersed intimately and uniformly throughout a matrix consisting essentially of a polymer of at least one perhaloethylene from the group consisting of trifluorochloroethylene and tetrafluoroethylene, whereby the electrolysis cell is divided by means of said membrane into an anode and a cathode compartment.

3. In the electrolytic conversion of sodium chloride to sodium hydroxide and elemental chlorine wherein a direct current is passed through an electrolysis cell containing a solution of said sodium chloride, the improvement which consists of interposing between the anode and the cathode of said cell and adjacent to said anode an essentially continuous and non-porous, permselective membrane comprising particles of cation-exchange resin dispersed intimately and uniformly throughout a matrix consisting essentially of a polymer of at least one perhaloethylene from the group consisting of trifluorochloroethylene and tetrafluoroethylene, thereby forming an anode compartment which is separated from the remainder of the cell by means of said membrane.

4. In the electrolytic conversion of sodium chloride to sodium hydroxide and elemental chlorine wherein a direct current is passed through an electrolysis cell containing a solution of said sodium chloride, the improvement which consists of interposing between the anode and the cathode of said cell an essentially continuous and non-porous, permselective membrane comprising particles of cation-exchange resin dispersed intimately and uniformly throughout a matrix consisting essentially of a polymer of at least one perhaloethylene from the group consisting of trifluorochloroethylene and tetrafluoroethyene, whereby the electrolysis cell is divided by means of said membrane into an anode and a cathode compartment.

5. In the electrolytic conversion of sodium chloride to sodium hydroxide and elemental chlorine wherein a direct current is passed through an electrolysis cell containing a solution of said sodium chloride, the improvement which consists of interposing between the anode and the cathode of said cell an essentially continuous and non-porous permselective membrane comprising particles of a sulfonic cation-exchange resin dispersed intimately and uniformly throughout a matrix consisting essentially of a polymer of trifluorochloroethylene, whereby the electrolysis cell is divided by means of said membrane into an anode compartment and a cathode compartment.

6. In the electrolytic conversion of sodium chloride to sodium hydroxide and elemental chlorine wherein a direct current is passed through an electrolysis cell containing a solution of said sodium chloride, the improvement which consists of interposing between the anode and the cathode of said cell an essentially continuous and non-porous, permselective membrane comprising particles of a carboxylic cation-exchange resin dispersed intimately and uniformly throughout a matrix consisting essentially of a polymer of trifluorochloroethylene, whereby the electrolysis cell is divided by means of said membrane into an anode compartment and a cathode compartment.

7. In the electrolytic conversion of sodium chloride to sodium hydroxide and elemental chlorine wherein a direct current is passed through an electrolysis cell containing a solution of sodium chloride, the improvement which consists of interposing between the anode and the cathode of said cell an essentially continuous and non-porous permselective membrane comprising particles of a cation-exchange resin which is a sulfonated cross-linked copolymer of styrene and divinylbenzene dispersed intimately and uniformly throughout a matrix consisting essentially of a polymer of trifluorochloroethylene, whereby the electrolysis cell is divided by means of said membrane into an anode compartment and a cathode compartment.

8. An essentially continuous and non-porous, permselective cationic membrane comprising discrete particles of an insoluble, infusible cation-exchange resin dispersed intimately and uniformly throughout a matrix consisting essentially of at least one polymer of a perhaloethylene from the group consisting of trifluorochloroethylene and tetrafluoroethylene.

9. An essentially continuous and non-porous, permselective cationic membrane comprising discrete particles of an insoluble, infusible cation-exchange resin dispersed intimately and uniformly throughout a matrix consisting essentially of polytrifluorochloroethylene.

10. An essentially continuous and non-porous, permselective cationic membrane comprising discrete particles of an insoluble, infusible, sulfonic cation-exchange resin dispersed intimately and uniformly throughout a matrix consisting essentially of polytrifluorochloroethylene.

11. An essentially continuous and non-porous, permselective cationic membrane comprising discrete particles of an insoluble, infusible, carboxylic cation-exchange resin dispersed intimately and uniformly throughout a matrix consisting essentially of polytrifluorochloroethylene.

12. An essentially continuous and non-porous, permselective cationic membrane comprising discrete particles of an insoluble, infusible, cation-exchange resin which is a sulfonated cross-linked copolymer of styrene and divinylbenzene dispersed intimately and uniformly throughout a matrix consisting essentially of polytrifluorochloroethylene.

13. An essentially continuous and non-porous, permselective cationic membrane comprising discrete particles of an insoluble, infusible cation-exchange resin dispersed intimately and uniformly throughout a matrix consisting essentially of a mixture of polytetrafluoroethylene and polyethylene.

14. An essentially continuous and non-porous, permselective cationic membrane comprising discrete particles of an insoluble, infusible, sulfonic cation-exchange resin dispersed intimately and uniformly throughout a matrix consisting essentially of at least one polymer of a perhaloethylene from the group consisting of trifluorochloroethylene and tetrafluoroethylene.

15. An essentially continuous and non-porous, permselective cationic membrane comprising discrete particles of an insoluble, infusible, carboxylic cation-exchange resin dispersed intimately and uniformly throughout a matrix consisting essentially of at least one polymer of a perhaloethylene from the group consisting of trifluorochloroethylene and tetrafluoroethylene.

16. An essentially continuous and non-porous, permselective cationic membrane comprising discrete particles of an insoluble, infusible cation-exchange resin which is a sulfonated cross-linked copolymer of styrene and divinylbenzene dispersed intimately and uniformly throughout a matrix consisting essentially of at least one polymer of a perhaloethylene from the class consisting of trifluorochloroethylene and tetrafluoroethylene.

17. An essentially continuous and non-porous, permselective cationic membrane comprising discrete particles of an insoluble cation-exchange resin dispersed intimately and uniformly throughout a matrix consisting essentially of a minimum of about 25% of at least one polymer of a perhaloethylene from the class consisting of trifluorochloroethylene and tetrafluoroethylene, blended together with at least one other thermoplastic resin from the group consisting of polyethylene, polyvinyl chloride and copolymers of vinyl chloride and vinylidene chloride.

References Cited in the file of this patent

UNITED STATES PATENTS

| | | |
|---|---|---|
| 2,393,967 | Brubaker | Feb. 5, 1946 |
| 2,614,976 | Patnode et al. | Oct. 21, 1952 |
| 2,636,851 | Juda et al. | Apr. 28, 1953 |
| 2,662,072 | Miller | Dec. 8, 1953 |
| 2,681,320 | Bodamer | June 15, 1954 |
| 2,681,324 | Hochberg | June 15, 1954 |